United States Patent
Bachu et al.

(10) Patent No.: US 8,850,455 B1
(45) Date of Patent: Sep. 30, 2014

(54) METHOD AND SYSTEM FOR PARENT BACKUP APPLICATION MONITORING OF CHILDREN BACKUP APPLICATIONS

(71) Applicant: EMC Corporation, Hopkinton, MA (US)

(72) Inventors: Kiran K. Bachu, Cupertino, CA (US); Vladimir Mandic, San Jose, CA (US); Richard Meier, Campbell, CA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/930,373

(22) Filed: Jun. 28, 2013

(51) Int. Cl.
*G06F 13/00* (2006.01)
*G06F 9/54* (2006.01)

(52) U.S. Cl.
CPC .................................... *G06F 9/54* (2013.01)
USPC ............ 719/313; 707/610; 707/640; 711/162

(58) Field of Classification Search
CPC . G06F 9/546; G06F 11/1451; G06F 11/1456; G06F 17/30575
USPC .................... 707/610, 640; 711/162; 719/313
See application file for complete search history.

(56) References Cited

U.S. PATENT DOCUMENTS

| | | | |
|---|---|---|---|
| 7,702,867 B2 * | 4/2010 | Coombs et al. | 711/162 |
| 8,140,789 B2 * | 3/2012 | Nagata et al. | 711/162 |
| 8,281,093 B1 * | 10/2012 | Krishnan et al. | 711/162 |
| 2012/0246417 A1 * | 9/2012 | Kaji et al. | 711/154 |

* cited by examiner

*Primary Examiner* — Andy Ho
(74) *Attorney, Agent, or Firm* — Dergosits & Noah LLP; Todd A. Noah

(57) ABSTRACT

Parent backup application monitoring of children backup applications is described. Child backup information, including an execution of a child backup task by a child backup application, is communicated from the child backup application to a parent backup application. Second child backup information, including an execution of a second child backup task by a second child backup application, may be communicated from the second child backup application to the parent backup application. A parent backup task is executed by the parent backup application. At least one child backup application inherently lacks a functionality to execute the parent backup task as the parent backup application executes the parent backup task. A report is generated based on the child backup information.

20 Claims, 3 Drawing Sheets

METHOD AND SYSTEM FOR PARENT BACKUP APPLICATION MONITORING OF CHILDREN BACKUP APPLICATIONS

BACKGROUND

If a software error corrupts a database, or if erroneous data updates the database, a database administrator may restore the database to a previous uncorrupted state that does not include the corrupted or erroneous data. A backup application executes a backup operation either occasionally or continuously to enable this restoration, storing a copy of each desired database state (the values of its data and these values' embedding in the database's data structures) within dedicated backup files. When the database administrator decides to return the database to a previous state, the database administrator specifies the desired previous state by identifying a desired point in time when the database was in this state, and instructs the backup application to execute a restore operation to restore the database with a copy of the backup files corresponding to that state. An additional copy that is made of the backup copy and stored separately from the backup files may be referred to as a clone copy of the backup files.

BRIEF DESCRIPTION OF THE DRAWINGS

Advantages of the subject matter claimed will become apparent to those skilled in the art upon reading this description in conjunction with the accompanying drawings, in which like reference numerals have been used to designate like elements, and in which:

DETAILED DESCRIPTION

Different backup applications may offer differing functionalities. For example, a virtual machine backup application may offer functionalities designed to create backup copies of virtual machine datasets, but lack the functionality to clone copies of the backup copies and store the cloned copies on an external destination node. In another example, an enterprise backup application may offer functionalities designed to create clone copies of an enterprise's backup copies and store the clone copies to an external destination node, but lack the functionalities to optimally create backup copies of virtual machine datasets.

Embodiments herein enable parent backup application monitoring of children backup applications. Child backup information including an execution of a child backup task by a child backup application is communicated from the child backup application to a parent backup application. For example, a virtual machine backup application creates a backup copy of a virtual machine dataset, and communicates backup information that includes the creation of this first backup copy to an enterprise backup application. Second child backup information that includes an execution of a second child backup task by a second child backup application may be communicated from the second child backup application to the parent backup application. For example, a relational database backup application creates a backup copy of a relational database, and communicates backup information that includes the creation of this second backup copy to the enterprise backup application. A parent backup task is executed by the parent backup application, wherein at least one child backup application inherently lacks a functionality to execute the parent backup task as the parent backup application executes the parent backup task. For example, the enterprise backup application creates clone copies of the first backup copy and the second backup copy, and stores the clone copies to an external destination node, which neither the virtual machine backup application nor the relational database backup application can do. A report is generated based on child backup information. For example, the enterprise backup application generates a report that indicates that the virtual storage device used by the virtual machine backup application is running out of available storage capacity. The parent backup application leverages its own functionalities to do what the parent backup application is best designed to do and leverages the children backup applications' functionalities to do what the children backup applications are best designed to do.

Figure 1:
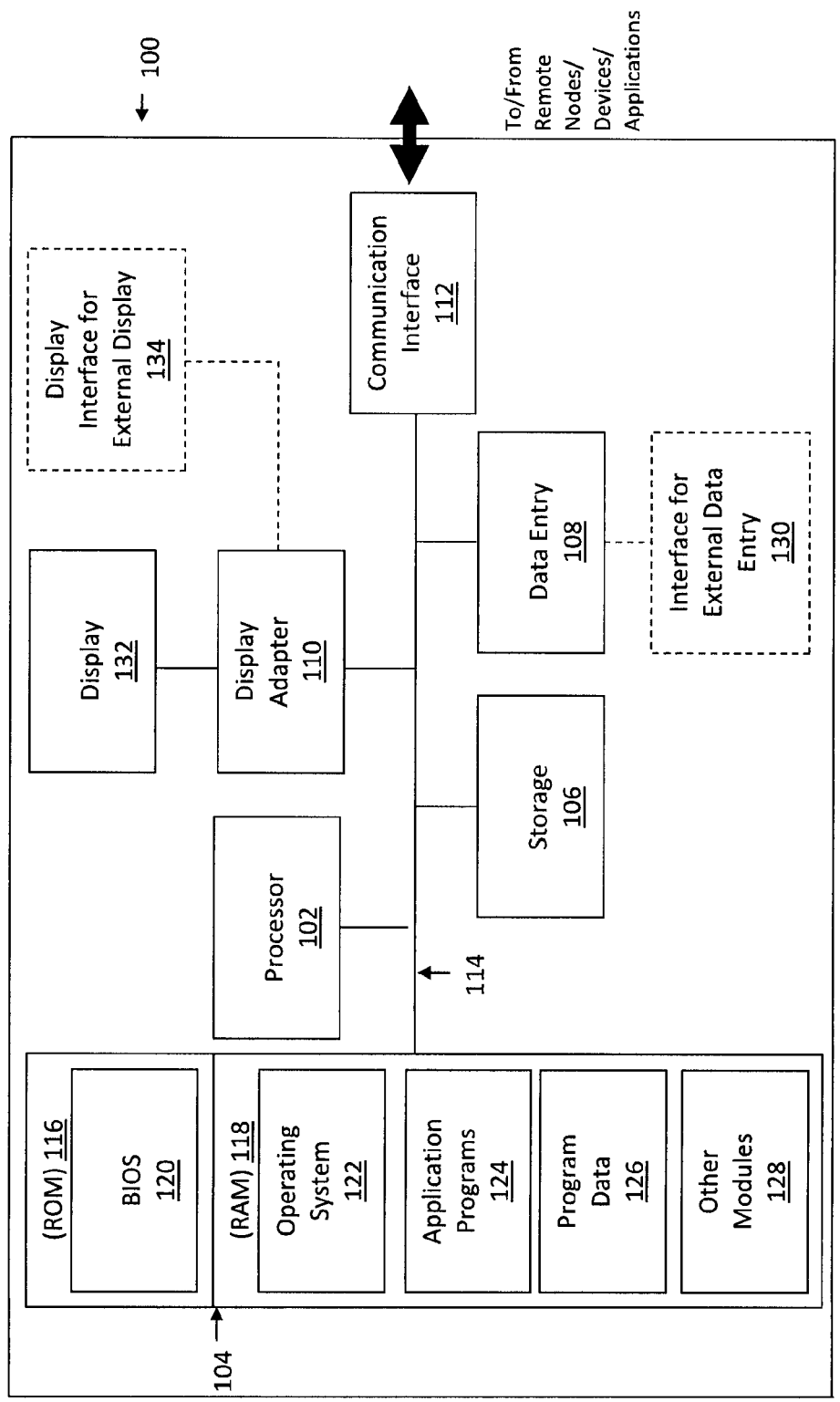
FIG. 1 is a block diagram illustrating an example hardware device in which the subject matter may be implemented.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, data entry module 108, display adapter 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106 and/or received via data entry module 108.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128. A user may enter commands and information into the hardware device 100 through data entry module 108. Data entry module 108 may include mechanisms such as a keyboard, a touch screen, a pointing device, etc. Other external input devices (not shown) are connected to the hardware device 100 via external data entry interface 130. By way of example and not limitation, external input devices may include a microphone, joystick, game pad, satellite dish, scanner, or the like. In some embodiments, external input devices may include video or audio input devices such as a video camera, a still camera, etc. Data entry module 108 may be configured to receive input from one or more users of device 100 and to deliver such input to processing unit 102 and/or memory 104 via bus 114.

A display 132 is also connected to the bus 114 via display adapter 110. Display 132 may be configured to display output of device 100 to one or more users. In some embodiments, a given device such as a touch screen, for example, may function as both data entry module 108 and display 132. External display devices may also be connected to the bus 114 via external display interface 134. Other peripheral output devices, not shown, such as speakers and printers, may be connected to the hardware device 100.

The hardware device 100 may operate in a networked environment using logical connections to one or more remote nodes (not shown) via communication interface 112. The remote node may be another computer, a server, a router, a peer device or other common network node, and typically includes many or all of the elements described above relative to the hardware device 100. The communication interface 112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context. In an embodiment, the computer system 100 includes one or more methods for parent backup application monitoring of children backup applications.

In the prior art, different backup applications may offer differing functionalities. Embodiments herein enable parent backup application management of children backup applications. The parent backup application leverages its own functionalities to do what the parent backup application is best designed to do and leverages the children backup applications' functionalities to do what the children backup applications are best designed to do.

Figure 2:
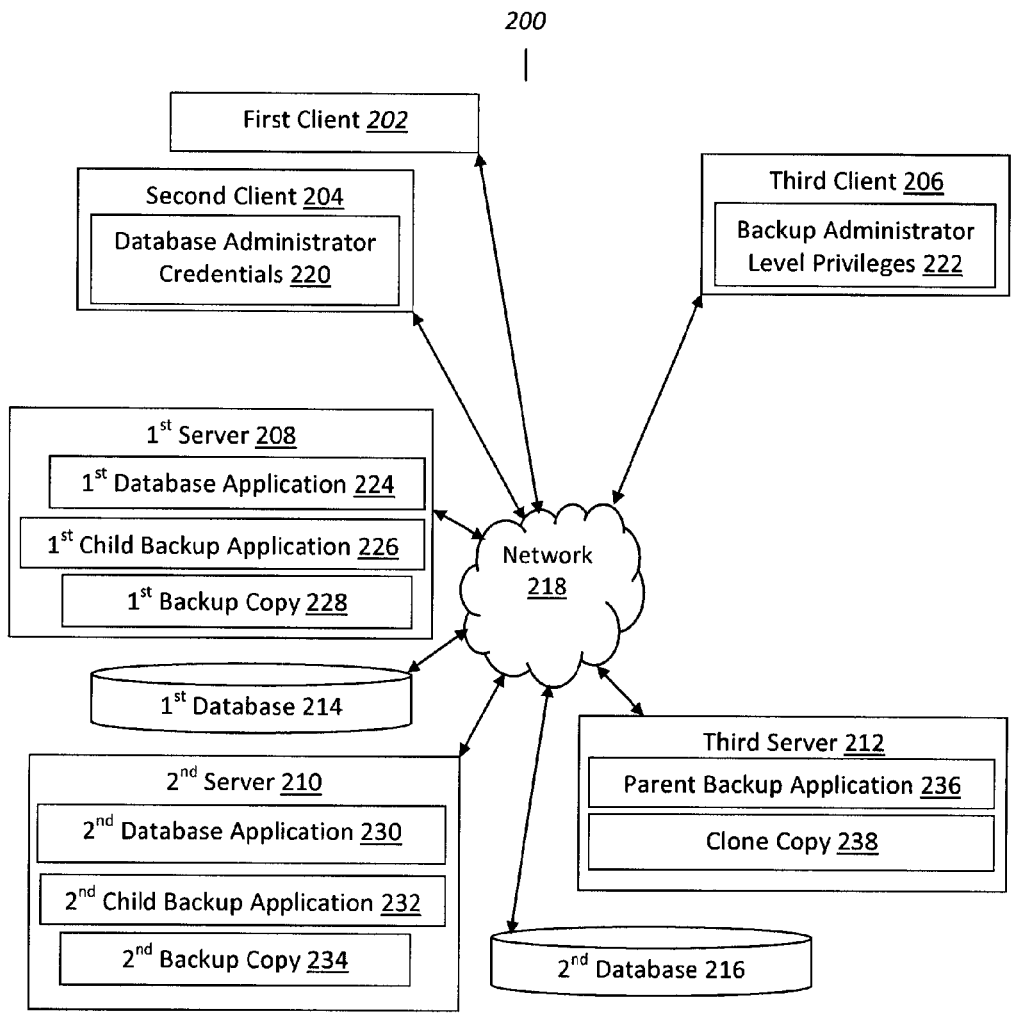
FIG. 2 illustrates a block diagram of an example system for parent backup application monitoring of children backup applications, under an embodiment.

FIG. 2 illustrates a block diagram of a system that enables parent backup application monitoring of children backup applications, under an embodiment. As shown in FIG. 2, system 200 may illustrate a cloud computing environment in which data, applications, services, and other resources are stored and delivered through shared data-centers and appear as a single point of access for the users. The system 200 may also represent any other type of distributed computer network environment in which servers control the storage and distribution of resources and services for different client users.

In an embodiment, the system 200 represents a cloud computing system that includes a first client 202, a second client 204, and a third client 206; and a first server 208, a second server 210, and a third server 212, that are provided by a hosting company. The first server 208 is associated with a first database 214, and the second server 210 is associated with a second database 216. The clients 202-206, the servers 208-212, and the databases 214-216 communicate via a network 218. Although FIG. 2 depicts the system 200 with three clients 202-206, three servers 208-212, two databases 214-216, and one network 218, the system 200 may include any number of clients 202-206, servers 208-212, databases 214-216, and networks 218. The clients 202-206 and the servers 208-212 may each be substantially similar to the system 100 depicted in FIG. 1.

The first client 202 enables a user to access a database application as a system user. The second client 204 includes database administrator credentials 220 that enable a user to access a database application as a database administrator. The third client 206 includes backup administrator level privileges 222 that enable a user to access a backup application as a backup administrator. The first server 208 includes a first database application 224 that executes to access the first database 214, and also includes a first child backup application 226 that creates, stores, and possibly recovers a first backup copy 228 of a dataset accessed in the first database 214. Similarly, the second server 210 includes a second database application 230 that executes to access the second database 216, and also includes a second child backup application 232 that creates, stores, and possibly recovers a second backup copy 234 of a dataset accessed in the second database 216. Each of the backup copies 228 and 234 may be an image copy of data files a proprietary format file that includes parts or all of multiple data files, a full backup copy, and/or an incremental backup copy. The third server 212 includes a parent backup application 236 that creates, stores, and possibly recovers a clone copy 238 of the first backup copy 228 and/or the second backup copy 234. The first database 214 may be referred to as the virtual machine database 214, the second database 216 may be referred to as the relational database 216, the first child backup application 226 may be referred to as the virtual machine backup application 226, the second child backup application 230 may be referred to as the relational database backup application 230, and the parent backup application 236 may be referred to as the enterprise backup application 236.

FIG. 2 depicts the system elements 224-228 residing completely on the first server 208, the system elements 230-234 residing completely on the second server 210, and the system elements 236-238 residing completely on the third server 212. However, the system elements 224-238 may reside in any combination of partially on the first server 208, the second server 210, the third server 212, and partially on other servers that are not depicted in FIG. 2. Although FIG. 2 depicts one parent backup application 236 and two children backup applications 224 and 230 that correspond to the servers 208-212, the databases 214-216, and the system elements 224-238, the system 200 may include any number of parent backup applications 236 and any number of children backup applications 224 and 230 and their corresponding number of servers 208-212, databases 214-216, and system elements 224-238.

A child backup application communicates child backup information that includes an execution of a child backup task by the child backup application to a parent backup application. For example, the virtual machine backup application 226 creates the backup copy 228 of the virtual machine database 214, and communicates backup information that includes the creation of this first backup copy 228 to the enterprise backup application 236, which may be a NetWorker® backup application. The first backup copy 228 may reside on a disk that is internal to the system for the first database application 224, such as a disk associated with the first server 208.

EMC Corporation's NetWorker® backup application is a suite of enterprise level data protection software that unifies and automates backup to tape, disk-based, and flash-based storage media across physical and virtual environments for granular and disaster recovery. Cross-platform support is provided for many environments, including Microsoft Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups. The core NetWorker® software backs up client file systems and operating system environment. Add-on database and application modules provide backup services for products such as Microsoft® Exchange Server. Client backup data can be sent to a remote NetWorker storage node or stored on a locally attached device by the use of a dedicated storage node. EMC Corporation's NetWorker® modules for Microsoft® applications supports Microsoft® products such as Microsoft® Exchange, Microsoft® Sharepoint, Microsoft® SQL Server, and Microsoft® Hyper-V servers.

A backup administrator may use the third client 206 to access the user interface for the parent backup application 236 to monitor the children backup applications 226 and 232 without needing to access the user interfaces for the children backup applications 226 and 232, as the children backup applications 226 and 232 provide their backup information to the parent backup application 236. In this manner, the parent backup application 236 may monitor a large number of children backup applications 226 and 232 that do not provide enterprise-wide backups individually to provide enterprise-wide backups collectively.

Communicating from a child backup application to a parent backup application may be in response to a request from the parent backup application to the child backup application. For example, the virtual machine backup application 226 may communicate the backup information that includes the creation of the first backup copy 228 to the enterprise backup application 236 whenever the virtual machine backup application 226 creates the first backup copy 228, or the enterprise backup application 236 may periodically poll the virtual machine backup application 226 to determine whenever the virtual machine backup application 226 has backup information that includes the creation of the first backup copy 228.

A second child backup application may also communicate second backup information that includes an execution of a second child backup task by the second child backup application to a parent backup application. For example, the relational database backup application 232 creates the second backup copy 234 of the relational database 216, and communicates backup information that includes the creation of this second backup copy 234 to the enterprise backup application 236, wherein the second backup copy 234 may reside on a disk that is internal to the system for the second database application 230, such as a disk associated with the second server 210.

The first child backup information and/or the second child backup information may include a number of child backup tasks currently being executed, a number of child backup tasks that failed, a number of child backup tasks that succeeded, a number of child backup tasks that aborted, an estimated size associated with the child backup task, a deduplicated size associated with the backup task, a name associated with the child backup task, a client associated with the child backup task, a storage device associated with the backup task, a total capacity associated with the storage device, a used capacity associated with the storage device, a retention associated with the child backup task, and a backup policy associated with the child backup application 226 or 232. The parent backup application 236 may register all backups created by the child backup applications 226 and 232 in a catalogue. The parent backup application 236 may use the child backup information registered in the catalogue to monitor the jobs and the health of the children backup applications 226 and 232 and generate status reports for the children backup applications 226 and 232. Since the parent backup application 236 monitors each task performed by the child backup applications 226 and 232, leveraging the reporting tools of the parent backup application 236, there is no need for a system user to individually monitor the child backup applications 226 and 232. The parent backup application 236 generates reports at the enterprise level, rather than at the level of an individual child backup application 226 or 232. The parent backup application 236 may generate a report based on a host, a dataset, a virtual machine center, or any other grouping of child backup information. These reports may include a backup time, a backup size, a deduplication size, and other types of child backup information. The parent backup application 236 may also use the child backup information as the basis of reports to take remedial actions, an example of which is discussed below, to address potential problems for the children backup applications 226 and 232. A backup administrator may use the third client 206 to access the user interface for the parent backup application 236 without needing to access the user interfaces for the children backup applications 226 and 232 because the parent backup application 236 has access to the child backup information associated with the children backup applications 226 and 232.

A parent backup application executes a parent backup task, wherein at least one child backup application inherently lacks a functionality to execute the parent backup task as the parent backup application executes the parent backup task. For example, the enterprise backup application 236 creates clone copies 238 of the first backup copy 228 and the second backup copy 234, and stores the clone copies 238 to an external destination node, which neither the virtual machine backup application 224 nor the relational database backup application 230 can do. In another example, a child backup application may be able to execute the parent backup task, but not as efficiently as the parent backup application 236 executes the parent backup task. In yet another example, the parent backup application 236 may not be able to create the backup copies 228 and 234, at least not as efficiently as the child backup applications 226 and 232 can create the backup copies 228 and 234.

When the parent backup application 236 stores the clone copy 238 on an external destination node, the parent backup application 236 can protect the clone copy 238 of the backup copies 228 and 234 even if the databases 214 and 216, and the backup copies 228 and 234 stored on disks associated with the servers 208 and 210 are corrupted. The external destination node, such as the third server 212, may include multiple destination nodes, and the multiple destination nodes may include a disk destination node, a tape destination node, and/or a destination node that is a combination of disks and tapes. For example, the parent backup application 236 may store the clone copy 238 on a disk, on a tape, or partly on a disk and partly on a tape associated with the third server 212. A backup administrator may access the parent backup application 236 via the third client 206 to specify a priority for storing the clone copy 238 on the external destination nodes, such as storing only on disks, or storing on disks before storing on a combination of disks and tapes. Additionally, a backup administrator may use the parent backup application 236 to specify the options for the clone copy 238 to be encrypted, deduplicated, and/or compressed while being transmitted from a source, and the options for the clone copy 238 to be decrypted and/or decompressed when stored on an external destination node. Data deduplication significantly reduces cloning time by only storing unique daily changes, while always maintaining daily clone copies of full backup files for an immediate single-step restore. The transmission of deduplicated clone copies sends only changed blocks, thereby reducing network traffic.

The child backup applications 226 and 232 may typically select to restore the databases 214 and 216 from the backup copies 228 and 234 stored on the disks associated with the servers 208 and 210, respectively. However, if a child backup application determines that its backup file stored on the disk associated with its server is corrupted or absent, the child backup application may request to recover the clone copy 238 from the disk associated with the third server 212, and may restore the clone copy 238 to its corrupted database. Even if a child backup application requests to recover the clone copy 238 from the disk associated with the third server 212, a database administrator requesting the recovery via the second client 204 participates in a single step recovery process, as the database administrator does not have to request assistance from the backup administrator, or request the separate loading of any storage medium used for long-term data retention, such as a tape storage.

A parent backup application generates a report based on child backup information. For example, the enterprise backup application 236 generates a report indicating that the virtual storage device used by the virtual machine backup application 226 is running out of available storage capacity, and sends this report to the third client 206 for viewing by the backup administrator.

A parent backup application optionally executes a remedial action based on the report, wherein the remedial action optionally includes allocating additional resources, creating another instance of a child backup application, notifying a backup administrator, and/or terminating execution of a child backup application. For example, the enterprise backup application 236 allocates more storage capacity to the virtual storage device used by the virtual machine backup application 226 because the report indicates that the virtual storage device used by the virtual machine backup application 226 is running out of available storage capacity. The parent backup application 236 leverages its own functionalities to do what the parent backup application 236 is best designed to do and leverages the children backup applications' functionalities to do what the children backup applications 226 and 232 are best designed to do.

Figure 3:
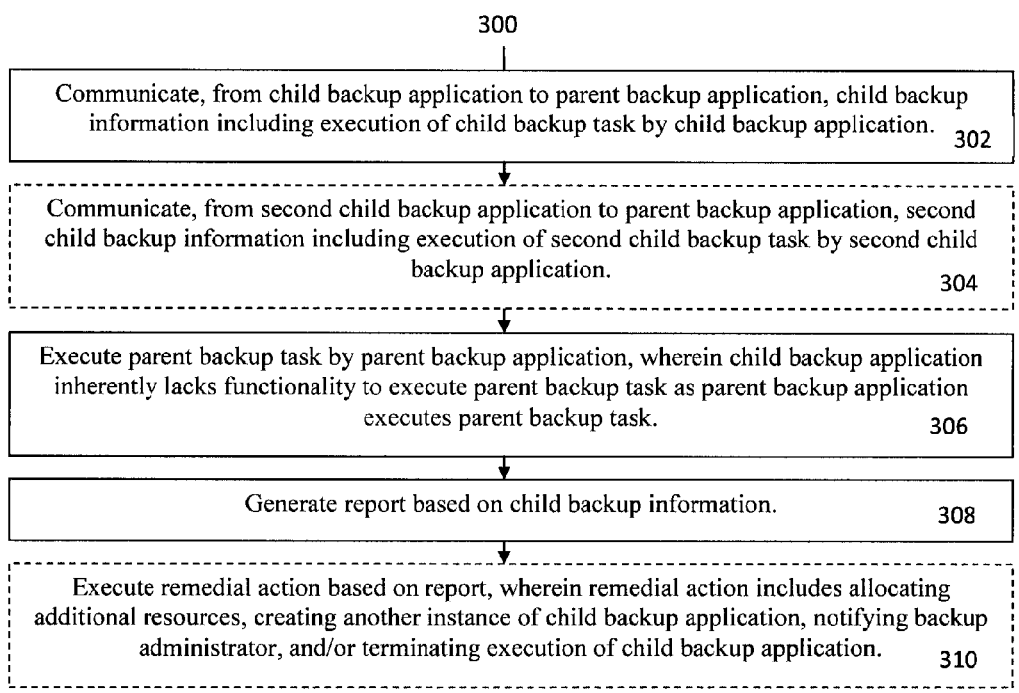
FIG. 3 is a flowchart that illustrates a method of parent backup application monitoring of children backup applications, under an embodiment.

FIG. 3 is a flowchart that illustrates a method of parent backup application monitoring of children backup applications. Flowchart 300 illustrates method acts illustrated as flowchart blocks for certain steps involved in and/or between the clients 202-206 and/or the servers 208-212 of FIG. 2.

Child backup information, including an execution of a child backup task by a child backup application, is communicated from the child backup application to a parent backup application, act 302. For example, the virtual machine backup application 226 creates the first backup copy 228 of a virtual machine dataset 214, and communicates backup information including the creation of this first backup copy 228 to the enterprise backup application 236.

Second child backup information, including an execution of a second child backup task by a second child backup application, is optionally communicated from the second child backup application to a parent backup application, act 304. For example, the relational database backup application 232 creates the second backup copy 234 of the relational database 216, and communicates second child backup information including the creation of this second backup copy 234 to the enterprise backup application 236.

A parent backup task is executed by a parent backup application, wherein at least one child backup application inherently lacks a functionality to execute the parent backup task as the parent backup application executes the parent backup task, act 306. For example, the enterprise backup application 236 creates clone copies 238 of the first backup copy 228 and the second backup copy 234, and stores the clone copies 238 to an external destination node, which neither the virtual machine backup application 224 nor the relational database backup application 230 can do.

A report is generated based on child backup information, act 308. For example, the enterprise backup application 236 generates a report which indicates that the virtual storage device used by the virtual machine backup application 226 is running out of available storage capacity.

A remedial action is optionally executed based on a report, wherein the remedial action optionally includes allocating additional resources, creating another instance of a child backup application, notifying a backup administrator, and/or terminating execution of a child backup application, act 310. For example, the enterprise backup application 236 allocates more storage capacity to the virtual storage device used by the virtual machine backup application 226 because the report indicates that the virtual storage device used by the virtual machine backup application 226 is running out of available storage capacity.

Although FIG. 3 depicts the acts 302-310 occurring in a specific order, the acts 302-310 may occur in another order. Executing the flowchart 300 enables parent backup application monitoring of children backup applications. The parent backup application 236 leverages its own functionalities to do what the parent backup application 236 is best designed to do and leverages the children backup applications' functionalities to do what the children backup applications 226 and 232 are best designed to do.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A system for parent backup application monitoring of children backup applications, the system comprising:
   a processor-based application executed on a computer and configured to:
   communicate, from a child backup application to a parent backup application, child backup information comprising an execution of a child backup task by the child backup application;
   execute a parent backup task by the parent backup application, wherein the child backup application inherently lacks a functionality to execute the parent backup task as the parent backup application executes the parent backup task; and
   generate a report based on the child backup information.

2. The system of claim 1, wherein communicating, from the child backup application to the parent backup application, is in response to a request from the parent backup application to the child backup application.

3. The system of claim 1, wherein the child backup information further comprises at least one of a number of child backup tasks currently being executed, a number of child backup tasks that failed, a number of child backup tasks that succeeded, a number of child backup tasks that aborted, an estimated size associated with the child backup task, a deduplicated size associated with the backup task, a name associated with the child backup task, a client associated with the child backup task, a storage device associated with the backup task, a total capacity associated with the storage device, a used capacity associated with the storage device, a retention associated with the child backup task, and a backup policy associated with the child backup application.

4. The system of claim 1, wherein the child backup task comprises creating a backup copy of a data set, and wherein the parent backup task comprises creating a clone copy of the backup copy and storing the clone copy on an external destination node.

5. The system of claim 1, wherein the processor-based application is further configured to execute a remedial action based on the report, and wherein the remedial action comprises at least one of allocating additional resources, creating another instance of the child backup application, notifying a backup administrator, and terminating execution of the child backup application.

6. The system of claim 1, wherein the processor-based application is further configured to communicate, from a second child backup application to the parent backup application, second child backup information comprising an execution of a second child backup task by the second child backup application, and wherein the second child backup application inherently lacks the functionality to execute the parent backup task as the parent backup application executes the parent backup task.

7. The system of claim 1, wherein the parent backup application inherently lacks a functionality to execute the child backup task as the child backup application executes the child backup task.

8. A computer-implemented method for parent backup application monitoring of children backup applications, the method comprising:
communicating, from a child backup application to a parent backup application, child backup information comprising an execution of a child backup task by the child backup application;
executing a parent backup task by the parent backup application, wherein the child backup application inherently lacks a functionality to execute the parent backup task as the parent backup application executes the parent backup task; and
generating a report based on the child backup information.

9. The method of claim 8, wherein communicating, from the child backup application to the parent backup application, is in response to a request from the parent backup application to the child backup application.

10. The method of claim 8, wherein the child backup information further comprises at least one of a number of child backup tasks currently being executed, a number of child backup tasks that failed, a number of child backup tasks that succeeded, a number of child backup tasks that aborted, an estimated size associated with the child backup task, a deduplicated size associated with the backup task, a name associated with the child backup task, a client associated with the child backup task, a storage device associated with the backup task, a total capacity associated with the storage device, a used capacity associated with the storage device, a retention associated with the child backup task, and a backup policy associated with the child backup application.

11. The method of claim 8, wherein the child backup task comprises creating a backup copy of a data set, and wherein the parent backup task comprises creating a clone copy of the backup copy and storing the clone copy on an external destination node.

12. The method of claim 8, wherein the method further comprises executing a remedial action based on the report, and wherein the remedial action comprises at least one of allocating additional resources, creating another instance of the child backup application, notifying a backup administrator, and terminating execution of the child backup application.

13. The method of claim 8, wherein the method further comprises communicating, from a second child backup application to the parent backup application, second child backup information comprising an execution of a second child backup task by the second child backup application, and wherein the second child backup application inherently lacks the functionality to execute the parent backup task as the parent backup application executes the parent backup task.

14. The method of claim 8, wherein the parent backup application inherently lacks a functionality to execute the child backup task as the child backup application executes the child backup task.

15. A computer program product, comprising a non-transitory computer-readable medium having a computer-readable program code embodied therein, the computer-readable program code adapted to be executed by one or more processors to implement a method for parent backup application monitoring of children backup applications, the method comprising:
communicating, from a child backup application to a parent backup application, child backup information comprising an execution of a child backup task by the child backup application;
executing a parent backup task by the parent backup application, wherein the child backup application inherently lacks a functionality to execute the parent backup task as the parent backup application executes the parent backup task; and
generating a report based on the child backup information.

16. The computer program product of claim 15, wherein communicating, from the child backup application to the parent backup application, is in response to a request from the parent backup application to the child backup application.

17. The computer program product of claim 15, wherein the child backup information further comprises at least one of a number of child backup tasks currently being executed, a number of child backup tasks that failed, a number of child backup tasks that succeeded, a number of child backup tasks that aborted, an estimated size associated with the child backup task, a deduplicated size associated with the backup task, a name associated with the child backup task, a client associated with the child backup task, a storage device associated with the backup task, a total capacity associated with the storage device, a used capacity associated with the storage device, a retention associated with the child backup task, and a backup policy associated with the child backup application.

18. The computer program product of claim 15, wherein the child backup task creating a backup copy of a data set wherein the parent backup task comprises creating a clone copy of the backup copy and storing the clone copy on an external destination node.

19. The computer program product of claim 15, wherein the method further comprises executing a remedial action based on the report, wherein the remedial action comprises at least one of allocating additional resources, creating another instance of the child backup application, notifying a backup administrator, and terminating execution of the child backup application.

20. The computer program product of claim 15, wherein the method further comprises communicating, from a second child backup application to the parent backup application, second child backup information comprising an execution of a second child backup task by the second child backup application, and wherein the second child backup application inherently lacks the functionality to execute the parent backup task as the parent backup application executes the parent backup task.

* * * * *